United States Patent
Suwa et al.

(10) Patent No.: US 11,041,225 B2
(45) Date of Patent: *Jun. 22, 2021

(54) HEAT-TREATED STEEL SHEET MEMBER AND METHOD FOR PRODUCING THE SAME

(71) Applicant: NIPPON STEEL & SUMITOMO METAL CORPORATION, Tokyo (JP)

(72) Inventors: Yoshihiro Suwa, Tokyo (JP); Shinichiro Tabata, Tokyo (JP); Masafumi Azuma, Tokyo (JP); Kazuo Hikida, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 840 days.

This patent is subject to a terminal disclaimer.

(21) Appl. No.: 15/563,989

(22) PCT Filed: Apr. 7, 2016

(86) PCT No.: PCT/JP2016/061425
§ 371 (c)(1),
(2) Date: Oct. 3, 2017

(87) PCT Pub. No.: WO2016/163468
PCT Pub. Date: Oct. 13, 2016

(65) Prior Publication Data
US 2018/0171429 A1 Jun. 21, 2018

(30) Foreign Application Priority Data

Apr. 8, 2015 (JP) .............................. JP2015-079387
Apr. 8, 2015 (JP) .............................. JP2015-079390
Jul. 15, 2015 (JP) .............................. JP2015-141644
Jul. 15, 2015 (JP) .............................. JP2015-141647

(51) Int. Cl.
| | | |
|---|---|---|
| *C21D 9/46* | (2006.01) |
| *C22C 38/14* | (2006.01) |
| *C22C 38/32* | (2006.01) |
| *C21D 1/19* | (2006.01) |
| *C22C 38/28* | (2006.01) |
| *C22C 38/20* | (2006.01) |
| *C22C 38/02* | (2006.01) |
| *C22C 38/22* | (2006.01) |
| *C22C 38/04* | (2006.01) |
| *C22C 38/26* | (2006.01) |
| *C21D 1/22* | (2006.01) |
| *C21D 1/18* | (2006.01) |
| *C21D 6/00* | (2006.01) |

(Continued)

(52) U.S. Cl.
CPC .................. *C21D 9/46* (2013.01); *C21D 1/18* (2013.01); *C21D 1/19* (2013.01); *C21D 1/22* (2013.01); *C21D 6/004* (2013.01); *C21D 6/005* (2013.01); *C21D 6/008* (2013.01); *C21D 8/0205* (2013.01); *C21D 8/0263* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/14* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/34* (2013.01);

(Continued)

(58) Field of Classification Search
CPC ... C21D 9/46; C21D 1/19; C21D 1/22; C21D 6/004; C21D 6/005; C21D 6/008; C21D 8/0205; C21D 8/0263; C21D 1/18; C21D 2211/001; C21D 2211/008; C22C 38/14; C22C 38/32; C22C 38/28; C22C 38/20; C22C 38/02; C22C 38/22; C22C 38/04; C22C 38/26; C22C 38/001; C22C 38/002; C22C 38/005; C22C 38/06; C22C 38/24; C22C 38/34; C22C 38/42; C22C 38/44; C22C 38/48; C22C 38/50; C22C 38/54; C22C 38/58; C22C 38/38; Y02P 10/20
See application file for complete search history.

(56) References Cited

U.S. PATENT DOCUMENTS 4,729,872 A * 3/1988 Kishida .................. C22C 38/22
420/105
2007/0125455 A1 6/2007 Yoshihara et al.
(Continued)

FOREIGN PATENT DOCUMENTS

BR 112017020165 6/2018
CN 1856589 11/2006
(Continued)

OTHER PUBLICATIONS

Gruppo Lucefin, "Roughness conversion table", Jun. 5, 2013, XP055492624, retrieved from the internet: URL: http://www.lucefin.com/wp-content/files_mf/1513679523roughness.pdf.

*Primary Examiner* — John A Hevey
(74) *Attorney, Agent, or Firm* — Clark & Brody LP

(57) ABSTRACT

A heat-treated steel sheet member having a chemical including, by mass %: C: 0.05 to 0.50%; Si: 0.50 to 5.0%; Mn: 1.5 to 4.0%; P: 0.05% or less; S: 0.05% or less; N: 0.01% or less; Ti: 0.01 to 0.10%; B: 0.0005 to 0.010%; Cr: optional amounts of Ni, Cu, Mo, V, Ca, Al, Nb, and REM, with the balance: Fe and impurities. The steel sheet member has a microstructure comprising: mainly martensite; and retained austenite of which a volume ratio is 5.0% or higher, a number density of retained carbide in the steel sheet member having circle-equivalent diameters of 0.1 mm or larger is $4.0 \times 10^3/\text{mm}^2$ or lower, $[(\log f_{g0} - \log f_g(0.02))/0.02 < 20.0]$ is satisfied when mechanical properties are measured using a sheet specimen specified in ASTM E8, a tensile strength is 1.4 GPa or higher, and a total elongation is 8.0% or higher.

13 Claims, No Drawings

(51) Int. Cl.

| | |
|---|---|
| *C21D 8/02* | (2006.01) |
| *C22C 38/00* | (2006.01) |
| *C22C 38/06* | (2006.01) |
| *C22C 38/24* | (2006.01) |
| *C22C 38/34* | (2006.01) |
| *C22C 38/42* | (2006.01) |
| *C22C 38/44* | (2006.01) |
| *C22C 38/48* | (2006.01) |
| *C22C 38/50* | (2006.01) |
| *C22C 38/54* | (2006.01) |
| *C22C 38/58* | (2006.01) |

(52) U.S. Cl.
CPC .............. *C22C 38/42* (2013.01); *C22C 38/44* (2013.01); *C22C 38/48* (2013.01); *C22C 38/50* (2013.01); *C22C 38/54* (2013.01); *C22C 38/58* (2013.01); *C21D 2211/001* (2013.01); *C21D 2211/008* (2013.01)

(56) References Cited

U.S. PATENT DOCUMENTS

| | | | |
|---|---|---|---|
| 2013/0167985 A1 | 7/2013 | Saito | |
| 2014/0065007 A1* | 3/2014 | Naitou | C22C 38/58 420/87 |
| 2015/0007911 A1 | 1/2015 | Murakami et al. | |
| 2015/0225821 A1 | 8/2015 | Hikida et al. | |
| 2018/0135145 A1 | 5/2018 | Suwa | |
| 2018/0135155 A1* | 5/2018 | Suwa | C22C 38/001 |
| 2018/0171429 A1 | 6/2018 | Suwa | |

FOREIGN PATENT DOCUMENTS

| | | |
|---|---|---|
| CN | 101208440 | 6/2008 |
| CN | 102282280 | 12/2011 |
| CN | 102333901 | 1/2012 |
| CN | 103108972 | 5/2013 |
| CN | 103194668 | 7/2013 |
| CN | 103314125 | 9/2013 |
| CN | 103459648 | 12/2013 |
| CN | 104160045 | 11/2014 |
| EP | 2 524 970 | 11/2012 |
| EP | 2 735 620 | 5/2014 |
| EP | 3 278 895 | 2/2018 |
| JP | 2002-102980 | 4/2002 |
| JP | 2002-180186 | 6/2002 |
| JP | 2004-353026 | 12/2004 |
| JP | 2005-169394 | 6/2005 |
| JP | 2006-219738 | 8/2006 |
| JP | 2007-211279 | 8/2007 |
| JP | 2007-291464 | 11/2007 |
| JP | 2008-045195 | 2/2008 |
| JP | 2008-240046 | 10/2008 |
| JP | 2008-261032 | 10/2008 |
| JP | 2009-203549 | 9/2009 |
| JP | 4441417 | 3/2010 |
| JP | 2010-156016 | 7/2010 |
| JP | 2010-242164 | 10/2010 |
| JP | 2011-111674 | 6/2011 |
| JP | 2012-001802 | 1/2012 |
| JP | 2012-031466 | 2/2012 |
| JP | 2012-180594 | 9/2012 |
| JP | 2013-044022 | 3/2013 |
| JP | 2013-184218 | 9/2013 |
| JP | 2013-185196 | 9/2013 |
| JP | 2013-185246 | 9/2013 |
| KR | 10-2014-0027451 | 3/2014 |
| RU | 2323983 | 5/2008 |
| RU | 2450079 | 5/2012 |
| RU | 2463359 | 10/2012 |
| RU | 2469102 | 12/2012 |
| RU | 2534703 | 12/2014 |
| WO | 2014/034714 | 3/2014 |
| WO | 2014/068794 | 5/2014 |

* cited by examiner

HEAT-TREATED STEEL SHEET MEMBER AND METHOD FOR PRODUCING THE SAME

TECHNICAL FIELD

The present invention relates to a heat-treated steel sheet member and a method for the heat-treated steel sheet member.

BACKGROUND ART

In the field of steel sheet for automobiles, there is an expanding application of high-strength steel sheets that have high tensile strengths so as to establish the compatibility between fuel efficiency and crash safety, backed by increasing stringencies of recent environmental regulations and crash safety standards. However, with an increase in strength, the press formability of a steel sheet decreases, and it becomes difficult to produce a product having a complex shape. Specifically, there arises a problem of a rupture of a high worked region owing to a decrease in ductility of a steel sheet with an increase in strength. In addition, there also arises a problem of spring back and side wall curl that occur owing to residual stress after the work, which degrades dimensional accuracy. Therefore, it is not easy to press-form a high-strength steel sheet, in particular a steel sheet having a tensile strength of 780 MPa or higher into a product having a complex shape. Note that, in place of the press forming, roll forming facilitates work of a high-strength steel sheet. However, the application of the roll forming is limited to components having uniform cross sections in a longitudinal direction.

For example, as disclosed in Patent Documents 1 to 3, a hot stamping technique has been employed in recent years as a technique to perform press forming on a material having difficulty in forming such as a high-strength steel sheet. The hot stamping technique refers to a hot forming technique in which a material to be subjected to forming is heated before performing forming. In this technique, since a material is heated before forming, the steel material is softened and has a good formability. This allows even a high-strength steel material to be formed into a complex shape with high accuracy. In addition, the steel material after the forming has a sufficient strength, because quenching is performed with a pressing die simultaneously with the forming.

For example, Patent Document 1 discloses that, by the hot stamping technique, it is possible to impart a tensile strength of 1400 MPa or higher to a formed steel material. In addition, Patent Document 2 discloses a pressed body subjected to hot press forming that is excellent in toughness and has a tensile strength of 1.8 GPa or higher. Furthermore, Patent Document 3 discloses a steel material that has a very high tensile strength of 2.0 GPa or higher and further has a good toughness and ductility.

LIST OF PRIOR ART DOCUMENTS

Patent Document

Patent Document 1: JP2002-102980A
Patent Document 2: JP2012-180594A
Patent Document 3: JP2012-1802A

SUMMARY OF INVENTION

Technical Problem

The hot forming technique such as the above hot stamping is an excellent forming method, which can provide a member with high-strength while securing a formability, but it requires heating to a temperature as high as 800 to 1000° C., which arises a problem of oxidation of a steel sheet surface. When scales of iron oxides generated at this point fall off during pressing and are adhered to a die during pressing, productivity decreases. In addition, there is a problem in that scales left on a product after pressing impair the appearance of the product.

Moreover, in the case of coating in a next process, scales left on a steel sheet surface degrades the adhesiveness property between a steel sheet and a coat, leading to a decrease in corrosion resistance. Thus, after press forming, scale removing treatment such as shotblast is needed. Therefore, required properties of generated scales include remaining unpeeled in such a way not to fall off and cause contamination of a die during pressing, and being easily peeled off and removed in shotblasting.

In addition, as mentioned before, steel sheets for automobiles are demanded to have a crash safety. The crash safety for automobiles is evaluated in terms of crushing strength and absorbed energy of the entire body or a steel sheet member in a crash test. In particular, the crushing strength greatly depends on the strength of a material, and thus there is a tremendously increasing demand for ultrahigh strength steel sheets. However, in general, with an increase in strength, fracture toughness and deformability decrease, and thus a rupture occurs in the early stage of crashing and collapsing of an automobile member, or a rupture occurs in a region where deformation concentrates, whereby a crushing strength corresponding to the strength of a material does not exert, resulting in a decrease in absorbed energy. Therefore, to enhance the crash safety, it is important to enhance the strength of a material, the toughness and ductility of the material, which is an important measure for the fracture toughness and deformability of an automobile member.

As to the techniques described in Patent Documents 1 and 2, while description is made about tensile strength and toughness, no consideration is given to ductility. In addition, according to the technique described in Patent Document 3, while it is possible to enhance tensile strength, toughness, and ductility, no studies are conducted about how to obtain an appropriate scale property, leaving room for improvement.

The present invention is made to solve the above problem and has an objective to provide a heat-treated steel sheet member that has a good scale property and a tensile strength of 1.4 GPa or higher, and is excellent in toughness and ductility. Note that a steel sheet member, in particular, one subjected to hot forming is often not a flat sheet but a molded body. However, in the present invention, the "heat-treated steel sheet member" also includes the case of a molded body. In addition, a steel sheet to be a starting material for the heat-treated steel sheet member before being subjected to heat treatment is also called a "steel sheet for heat treatment".

Solution to Problem

The present invention is made to solve the above problems, and has a gist of the following heat-treated steel sheet member and method for producing the heat-treated steel sheet member.

(1) A heat-treated steel sheet member having a chemical composition comprising, by mass %:
C: 0.05 to 0.50%;
Si: 0.50 to 5.0%;
Mn: 1.5 to 4.0%;

P: 0.05% or less;
S: 0.05% or less;
N: 0.01% or less;
Ti: 0.01 to 0.10%;
B: 0.0005 to 0.010%;
Cr: 0 to 1.0%;
Ni: 0 to 2.0%;
Cu: 0 to 1.0%;
Mo: 0 to 1.0%;
V: 0 to 1.0%;
Ca: 0 to 0.01%;
Al: 0 to 1.0%;
Nb: 0 to 1.0%;
REM: 0 to 0.1%; and
the balance: Fe and impurities, wherein
the steel sheet member has a steel micro-structure comprising:
mainly martensite;
and retained austenite of which a volume ratio is 5.0% or higher,
a number density of retained carbide being present in the steel sheet member and having circle-equivalent diameters of 0.1 μm or larger is $4.0 \times 10^3/mm^2$ or lower,
a value of strain induced transformation parameter k expressed by a following formula (i) is less than 20.0 when following mechanical properties are measured using a sheet specimen specified in ASTM E8,
a tensile strength is 1.4 GPa or higher, and
a total elongation is 8.0% or higher:

$$k(\log f_{\gamma 0} - \log f_{\gamma}(0.02))/0.02 \quad (i)$$

where meaning of each symbol in the above formula is as follows:

$f_{\gamma 0}$: Volume ratio of retained austenite present in the steel sheet member $f_{\gamma}(0.02)$: Volume ratio of retained austenite present in the steel sheet member after a true strain of 0.02 is applied to and unloaded from the member.

(2) The heat-treated steel sheet member according to above (1), wherein the chemical composition contains, by mass %, one or more elements selected from:
Cr: 0.01 to 1.0%;
Ni: 0.1 to 2.0%;
Cu: 0.1 to 1.0%;
Mo: 0.1 to 1.0%;
V: 0.1 to 1.0%;
Ca: 0.001 to 0.01%;
Al: 0.01 to 1.0%;
Nb: 0.01 to 1.0%; and
REM: 0.001 to 0.1%.

(3) The heat-treated steel sheet member according to above (1) or (2), wherein a Mn segregation degree α expressed by a following formula (ii) is 1.6 or lower.

$$\alpha = [\text{Maximum Mn concentration (mass \%) at sheet-thickness center portion}]/[\text{Average Mn concentration (mass \%) in ¼ sheet-thickness depth position from surface}] \quad (ii)$$

(4) The heat-treated steel sheet member according to any one of above (1) to (3), wherein an index of cleanliness of steel specified in G 0555(2003) is 0.10% or lower.

(5) A method for producing a heat-treated steel sheet member, the method comprising:
heating a steel sheet up to a temperature range from an $Ac_3$ point to the $Ac_3$ point+200° C. at an average temperature rise rate of 5° C./s or higher;
subsequently, cooling the steel sheet from the temperature range down to an Ms point at an upper critical cooling rate or higher; and
subsequently, cooling the steel sheet from the Ms point down to 100° C. at an average cooling rate of 5° C./s or lower, wherein
the steel sheet has a chemical composition comprising, by mass %:
C: 0.05 to 0.50%;
Si: 0.50 to 5.0%;
Mn: 1.5 to 4.0%;
P: 0.05% or less;
S: 0.05% or less;
N: 0.01% or less;
Ti: 0.01 to 0.10%;
B: 0.0005 to 0.010%;
Cr: 0 to 1.0%;
Ni: 0 to 2.0%;
Cu: 0 to 1.0%;
Mo: 0 to 1.0%;
V: 0 to 1.0%;
Ca: 0 to 0.01%;
Al: 0 to 1.0%;
Nb: 0 to 1.0%;
REM: 0 to 0.1%; and
the balance: Fe and impurities, wherein
a maximum height roughness Rz on a surface is 3.0 to 10.0 μm, and
a number density of carbide having circle-equivalent diameters of 0.1 μm or larger is $8.0 \times 10^3/mm^2$ or lower.

(6) The method for producing a heat-treated steel sheet member according to above (5), wherein the chemical composition contains, by mass %, one or more elements selected from:
Cr: 0.01 to 1.0%;
Ni: 0.1 to 2.0%;
Cu: 0.1 to 1.0%;
Mo: 0.1 to 1.0%;
V: 0.1 to 1.0%;
Ca: 0.001 to 0.01%;
Al: 0.01 to 1.0%;
Nb: 0.01 to 1.0%; and
REM: 0.001 to 0.1%.

(7) The method for producing a heat-treated steel sheet member according to above (5) or (6), wherein a number density of retained carbide present in the steel sheet member is $4.0 \times 10^3/mm^2$ or lower.

(8) The method for producing a heat-treated steel sheet member according to any one of above (5) to (7), wherein an Mn segregation degree α expressed by a following formula (ii) is 1.6 or lower.

$$\alpha = [\text{Maximum Mn concentration (mass \%) at sheet-thickness center portion}]/[\text{Average Mn concentration (mass \%) in ¼ sheet-thickness depth position from surface}] \quad (ii)$$

(9) The method for producing a heat-treated steel sheet member according to any one of above (5) to (8), wherein an index of cleanliness of steel specified in JIS G 0555 (2003) is 0.10% or lower.

(10) The method for producing a heat-treated steel sheet member according to any one of above (5) to (9), wherein the steel sheet is subjected to hot forming after being heated up to the temperature range and before being cooled down to the Ms point.

Advantageous Effects of Invention

According to the present invention, it is possible to obtain a heat-treated steel sheet member that has a tensile strength of 1.4 GPa or higher and is excellent in toughness and ductility.

DESCRIPTION OF EMBODIMENTS

The present inventors conducted intensive studies about the relation between chemical component and steel micro-structure so as to obtain a steel sheet member that has a good scale property and is excellent in toughness and ductility, with the result that the following findings were obtained.

(a) Steel sheets for heat treatment produced inside and outside of Japan have substantially the same components, containing C: 0.2 to 0.3% and Mn: about 1 to 2%, and further containing Ti and B. In a heat treatment step, this steel sheet is heated up to a temperature of $Ac_3$ point or higher, conveyed rapidly so as not to cause ferrite to precipitate, and rapidly cooled by die pressing down to a martensitic transformation starting temperature (Ms point), whereby a martensitic structure having a high strength is obtained.

(b) However, a detailed investigation on the steel micro-structure was conducted by the present inventors, and the results revealed that a steel sheet member after the heat treatment step is, in some cases, not made of a steel micro-structure all of which is consisting of martensite. The following reason is considered to be the cause of this fact. Within a temperature range of Ms point or lower in the rapid cooling process, the generation of heat with transformation decreases a cooling rate. As a result, the generated martensite is tempered on the spot (automatic temper), carbon diffuses into and segregates in untransformed austenite, and austenite is retained at about 1 to 2%. In addition, in some hot rolling condition or annealing condition, precipitating carbides are retained even after the heat treatment step.

(c) The present inventors conducted further detailed studies about the influence of retained austenite inevitably included in a heat-treated steel sheet member, on the properties of the steel sheet member. A steel having a composite steel micro structure that is ferrite-based and includes retained austenite is excellent in ductility by the transformation induced plasticity (TRIP) effect using strain induced transformation of the retained austenite. Meanwhile, it has not been clear so far whether the TRIP effect effectively functions in a steel having a composite steel micro structure that is martensite-based and includes retained austenite, such as an ultrahigh strength steel material.

(d) An investigation on how retained austenite transforms during the deformation of a steel material was conducted by the present inventors, and the results revealed that the TRIP effect also occurs in a martensite-based steel, enhancing ductility. In addition, the inventors conducted a toughness evaluation test such as the Charpy impact test and found that the TRIP effect of retained austenite enhances ductility as well as toughness.

(e) The amount of retained austenite in the steel micro-structure of a steel sheet member can be tremendously increased by optimizing a component design on elements such as C, Si, and Mn.

(f) For the enhancement of crash safety, uniform elongation has received attention. However, the enhancement of local elongation is also important to inhibit rupture in collision.

(g) When coarse carbides are excessively present in a steel sheet for heat treatment, and a lot of carbides are retained in grain boundaries after heat treatment, the toughness of a heat-treated steel sheet member is deteriorated, and in addition, local elongation decreases, resulting in the deterioration of crash safety. For this reason, the number density of retained carbide present in a steel sheet member needs to be set at a specified value or less.

(h) As for scale property, by making the amount of Si in steel in a steel sheet before heat treatment larger than those of conventional steel sheets, it is possible to obtain a desired scale property.

(i) By determining the segregation degree of Mn contained in a steel sheet for heat treatment, and decreasing the segregation degree, the toughness of a heat-treated steel sheet member is further enhanced.

(j) Inclusions included in a steel sheet member have a great influence on the toughness of an ultrahigh strength steel sheet. To improve the toughness, it is preferable to decrease the value of the index of cleanliness of steel specified in JIS G 0555 (2003).

The present invention is made based on the above findings. Hereinafter, each requirement of the present invention will be described in detail.

(A) Chemical Composition of Heat-Treated Steel Sheet Member and Steel Sheet for Heat Treatment The reasons for limiting the content of each element are as follows. Note that "%" for a content in the following description represents "mass %".

C: 0.05 to 0.50%

C (carbon) is an element that increases the hardenability of a steel and improves the strength of a steel sheet member after quenching. However, a content of C less than 0.05% makes it difficult to secure a sufficient strength of a steel sheet member after quenching. For this reason, the content of C is set at 0.05% or more. On the other hand, a content of C more than 0.50% leads to an excessively high strength of a steel sheet member after quenching, resulting in a significant degradation in toughness. For this reason, the content of C is set at 0.50% or less. The content of C is preferably 0.08% or more and is preferably 0.45% or less.

Si: 0.50 to 5.0%

Si (silicon) is an element that increases the hardenability of a steel and improves the strength of a steel material through solid-solution strengthening. Furthermore, Si is hardly dissolved in carbides, and thus Si suppresses the precipitation of carbides during hot forming, promoting the concentration of C in untransformed austenite. As a result, the Ms point significantly decreases, and a lot of austenite subjected to solid-solution strengthening are retained. In addition, Si generates $Fe_2SiO_4$ on a steel sheet surface during heat treatment, playing a role in inhibiting the generation of scale and reducing FeO in scales. This $Fe_2SiO_4$ serves as a barrier layer and intercepts the supply of Fe in scales, making it possible to reduce the thickness of the scales. Moreover, a reduced thickness of scales also has an advantage in that the scales hardly peel off during hot forming, while being easily peeled off during scale removing treatment after the forming.

To obtain these effects, Si needs to be contained at 0.50% or more. When the content of Si is 0.50% or more, retained carbides tend to be reduced. As will be described later, when a lot of carbides precipitate in a steel sheet before heat treatment, carbides are not dissolved but left during heat treatment, and a sufficient hardenability is not secured, so that a low strength ferrite precipitates, which may result in an insufficient strength. Therefore, also in this sense, the content of Si is set at 0.50% or more.

However, a content of Si in steel more than 5.0% causes a significant increase in heating temperature necessary for austenite transformation in heat treatment. This may lead to a rise in cost required in the heat treatment or lead to an insufficient quenching owing to insufficient heating. Consequently, the content of Si is set at 5.0% or less. The content of Si is preferably 0.75% or more and is preferably 4.0% or less.

Mn: 1.5 to 4.0%

Mn (manganese) is an element very effective in increasing the hardenability of a steel sheet and in securing strength with stability after quenching. Furthermore, Mn is an element that lowers the $Ac_3$ point to promote the lowering of a quenching temperature. However, a content of Mn less than 1.5% makes the effect insufficient. Meanwhile, a content of Mn more than 4.0% makes the above effect saturated and further leads to a degradation in toughness of a quenched region. Consequently, the content of Mn is set at 1.5 to 4.0%. The content of Mn is preferably 2.0% or more. In addition, the content of Mn is preferably 3.8% or less, more preferably 3.5% or less.

P: 0.05% or less

P (phosphorus) is an element that degrades the toughness of a steel sheet member after quenching. In particular, a content of P more than 0.05% results in a significant degradation in toughness. Consequently, the content of P is set at 0.05% or less. The content of P is preferably 0.005% or less.

S: 0.05% or less

S (sulfur) is an element that degrades the toughness of a steel sheet member after quenching. In particular, a content of S more than 0.05% results in a significant degradation in toughness. Consequently, the content of S is set at 0.05% or less. The content of S is preferably 0.003% or less.

N: 0.01% or less

N (nitrogen) is an element that degrades the toughness of a steel sheet member after quenching. In particular, a content of N more than 0.01% leads to the formation of coarse nitrides in steel, resulting in significant degradations in local deformability and toughness. Consequently, the content of N is set at 0.01% or less. The lower limit of the content of N need not be limited in particular. However, setting the content of N at less than 0.0002% is not economically preferable. Thus, the content of N is preferably set at 0.0002% or more, more preferably set at 0.0008% or more.

Ti: 0.01 to 0.10%

Ti (titanium) is an element that has an action of making austenite grains fine grains by inhibiting recrystallization and by forming fine carbides to inhibit the growth of the grains, at the time of performing heat treatment in which a steel sheet is heated at a temperature of the $Ac_3$ point or higher. For this reason, containing Ti provides an effect of greatly improving the toughness of a steel sheet member. In addition, Ti preferentially binds with N in steel, so as to inhibit the consumption of B (boron) by the precipitation of BN, promoting the effect of improving hardenability by B to be described later. A content of Ti less than 0.01% fails to obtain the above effect sufficiently. Therefore, the content of Ti is set at 0.01% or more. On the other hand, a content of Ti more than 0.10% increases the precipitation amount of TiC and causes the consumption of C, resulting in a decrease in strength of a steel sheet member after quenching. Consequently, the content of Ti is set at 0.10% or less. The content of Ti is preferably 0.015% or more and is preferably 0.08% or less.

B: 0.0005 to 0.010%

B (boron) has an action of increasing the hardenability of a steel dramatically even in a trace quantity, and is thus a very important element in the present invention. In addition, B segregates in grain boundaries to strengthen the grain boundaries, increasing toughness. Furthermore, B inhibits the growth of austenite grains in heating of a steel sheet. A content of B less than 0.0005% may fail to obtain the above effect sufficiently. Therefore, the content of B is set at 0.0005% or more. On the other hand, a content of B more than 0.010% causes a lot of coarse compounds to precipitate, resulting in a degradation in toughness of a steel sheet member. Consequently, the content of B is set at 0.010% or less. The content of B is preferably 0.0010% or more and is preferably 0.008% or less.

The heat-treated steel sheet member and a steel sheet for heat treatment before heat treatment according to the present invention may contain, in addition to the above elements, one or more elements selected from Cr, Ni, Cu, Mo, V, Ca, Al, Nb, and REM, in amounts described below.

Cr: 0 to 1.0%

Cr (chromium) is an element that can increase the hardenability of a steel and can secure the strength of a steel sheet member after quenching with stability. Thus, Cr may be contained. In addition, as with Si, Cr generates $FeCr_2O_4$ on a steel sheet surface during heat treatment, playing a role of inhibiting the generation of scale and reducing FeO in scales. This $FeCr_2O_4$ serves as a barrier layer and intercepts the supply of Fe in scales, making it possible to reduce the thickness of the scales. Moreover, a reduced thickness of scales also has an advantage in that the scales hardly peel off during hot forming, while being easily peeled off during scale removing treatment after the forming. However, a content of Cr more than 1.0% makes the above effect saturated, leading to an increase in cost unnecessarily. Therefore, if Cr is contained, the content of Cr is set at 1.0%. The content of Cr is preferably 0.80% or less. To obtain the above effect, the content of Cr is preferably 0.01% or more, more preferably 0.05% or more.

Ni: 0 to 2.0%

Ni (nickel) is an element that can increase the hardenability of a steel and can secure the strength of a steel sheet member after quenching with stability. Thus, Ni may be contained. However, a content of Ni more than 2.0% makes the above effect saturated, resulting in a decrease in economic efficiency. Therefore, if Ni is contained, the content of Ni is set at 2.0% or less. To obtain the above effect, it is preferable to contain Ni at 0.1% or more.

Cu: 0 to 1.0%

Cu (copper) is an element that can increase the hardenability of a steel and can secure the strength of a steel sheet member after quenching with stability. Thus, Cu may be contained. However, a content of Cu more than 1.0% makes the above effect saturated, resulting in a decrease in economic efficiency. Therefore, if Cu is contained, the content of Cu is set at 1.0% or less. To obtain the above effect, it is preferable to contain Cu at 0.1% or more.

Mo: 0 to 1.0%

Mo (molybdenum) is an element that can increase the hardenability of a steel and can secure the strength of a steel sheet member after quenching with stability. Thus, Mo may be contained. However, a content of Mo more than 1.0% makes the above effect saturated, resulting in a decrease in economic efficiency. Therefore, if Mo is contained, the content of Mo is set at 1.0% or less. To obtain the above effect, it is preferable to contain Mo at 0.1% or more.

V: 0 to 1.0%

V (vanadium) is an element that can increase the hardenability of a steel and can secure the strength of a steel sheet member after quenching with stability. Thus, V may be contained. However, a content of V more than 1.0% makes the above effect saturated, resulting in a decrease in economic efficiency. Therefore, if V is contained, the content of V is set at 1.0% or less. To obtain the above effect, it is preferable to contain V at 0.1% or more.

Ca: 0 to 0.01%

Ca (calcium) is an element that has the effect of refining the grains of inclusions in steel, enhancing toughness and ductility after quenching. Thus, Ca may be contained. However, a content of Ca more than 0.01% makes the effect saturated, leading to an increase in cost unnecessarily. Therefore, if Ca is contained, the content of Ca is set at 0.01% or less. The content of Ca is preferably 0.004% or less. To obtain the above effect, the content of Ca is preferably set at 0.001% or more, more preferably 0.002% or more.

Al: 0 to 1.0%

Al (aluminum) is an element that can increase the hardenability of a steel and can secure the strength of a steel sheet member after quenching with stability. Thus, Al may be contained. However, a content of Al more than 1.0% makes the above effect saturated, resulting in a decrease in economic efficiency. Therefore, if Al is contained, the content of Al is set at 1.0% or less. To obtain the above effect, it is preferable to contain Al at 0.01% or more.

Nb: 0 to 1.0%

Nb (niobium) is an element that can increase the hardenability of a steel and can secure the strength of a steel sheet member after quenching with stability. Thus, Nb may be contained. However, a content of Nb more than 1.0% makes the above effect saturated, resulting in a decrease in economic efficiency. Therefore, if Nb is contained, the content of Nb is set at 1.0% or less. To obtain the above effect, it is preferable to contain Nb at 0.01% or more.

REM: 0 to 0.1%

As with Ca, REM (rare earth metal) are elements that have the effect of refining the grains of inclusions in steel, enhancing toughness and ductility after quenching. Thus, REM may be contained. However, a content of REM more than 0.1% makes the effect saturated, leading to an increase in cost unnecessarily. Therefore, if REM are contained, the content of REM is set at 0.1% or less. The content of REM is preferably 0.04% or less. To obtain the above effect, the content of REM is preferably set at 0.001% or more, more preferably 0.002% or more.

Here, REM refers to Sc (scandium), Y (yttrium), and lanthanoids, 17 elements in total, and the content of REM described above means the total content of these elements. REM is added to molten steel in the form of, for example, an Fe—Si—REM alloy, which contains, for example, Ce (cerium), La (lanthanum), Nd (neodymium), and Pr (praseodymium).

As to the chemical composition of the heat-treated steel sheet member and the steel sheet for heat treatment according to the present invention, the balance consists of Fe and impurities.

The term "impurities" herein means components that are mixed in a steel sheet in producing the steel sheet industrially, owing to various factors including raw materials such as ores and scraps, and a producing process, and are allowed to be mixed in the steel sheet within ranges in which the impurities have no adverse effect on the present invention.

(B) Steel Micro-Structure of Heat-Treated Steel Sheet Member

The heat-treated steel sheet member according to the present invention has a steel micro-structure that is mainly consisting of martensite and in which the volume ratio of retained austenite is 5.0% or higher. The martensite present in this steel sheet member is automatically tempered martensite. In addition, the steel micro-structure mainly consisting of martensite means a steel micro-structure in which the volume ratio of martensite is 90% or higher. A steel sheet member may have intermixed steel micro-structures such as ferrite, pearlite, and bainite, and these steel micro-structures are tolerated as long as the total volume ratio thereof is 5.0% or lower.

Retained Austenite: 5.0% or Higher

Retained austenite undergoes martensitic transformation during deformation, so as to prevent necking and promote work hardening, improving ductility. In particular, when the volume ratio of retained austenite is less than 5.0%, ductility significantly decreases, which increases the risk of a rupture of an ultrahigh-strength heat-treated steel sheet member, resulting in a decrease in crash safety. Therefore, the volume ratio of retained austenite is set at 5.0% or higher. Meanwhile, as to the upper limit of the volume ratio of retained austenite, no special limit is provided. However, an excessive volume ratio of retained austenite results in a decrease in strength, and thus the volume ratio of retained austenite is preferably 10% or lower.

A normal technique to measure the phase fraction (volume ratio) of a steel micro-structure that contains a second phase, retained austenite included, is a technique using X-ray diffraction. This is a technique in which the diffracted X-ray intensities of a first phase (martensitic structure, body-centered cubic lattice) and a second phase (retained austenite phase, face-centered cubic lattice) are measured with a detector, and from the area ratios of the diffraction curves thereof, the volume ratios of the respective phases are measured. The technique enables the measurement of the volume percent of retained austenite in a steel sheet member with high precision. In the case where retained austenite as well as ferrite and the like are mixed in, they can be easily distinguished from one another under an optical microscope, and thus it is possible to measure the volume percent martensite, being the main steel micro-structure in a steel sheet member with high precision.

(C) Retained Carbide: $4.0 \times 10^3/\text{Mm}^2$ or Less

In performing heat treatment, a sufficient hardenability can be secured by the redissolution of carbides that are typically present in steel. However, when part of the carbides are not redissolved but retained, the sufficient hardenability cannot be secured, and ferrite, which is low-strength, precipitates. Therefore, as less carbides are retained, the hardenability increases, allowing a high strength to be secured.

In addition, a lot of retained carbides being present in a steel sheet before heat treatment not only results in a decrease in hardenability but also causes the retained carbide to accumulate in prior-$\gamma$ grain boundaries, which embrittles the grain boundaries. Furthermore, an excessive amount of retained carbide causes the retained carbide to serve as the starting points of voids during deformation, which facilitates coupling of the voids, and thus the ductility, in particular, the local elongation of a steel sheet member decreases, resulting in a degradation in crash safety.

In particular, the number density of retained carbide that are present in a steel sheet member after heat treatment and have circle-equivalent diameters of 0.1 μm or larger exceeds $4.0×10^3/mm^2$, the toughness and ductility of the steel sheet member after the heat treatment is degraded. For this reason, the number density of retained carbide present in a heat-treated steel sheet member and having circle-equivalent diameters of 0.1 μm or larger is set at $4.0×10^3/mm^2$ or less. Note that the number density of carbide that present in a steel sheet before heat treatment and have circle-equivalent diameters of 0.1 μm or larger is preferably set at $8.0×10^3/mm^2$ or less. The above carbides refer to those granular, and specifically, those having aspect ratios of 3 or lower will fall within the scope of being granular.

(D) Mechanical Property of Heat-Treated Steel Sheet Member

As described above, the TRIP effect using the strain induced transformation of retained austenite makes it possible to obtain a high ductility. However, when retained austenite transforms with a low strain, an increase in ductility by the TRIP effect cannot be expected. In other words, it is necessary to control not only the amount of retained austenite but also the nature of the retained austenite.

Specifically, when the value of α strain induced transformation parameter k, which is expressed by the following formula (i), becomes large, retained austenite transforms with a low strain. Consequently, the value of the strain induced transformation parameter k needs to be set at less than 20.0.

$$k=(\log f_{\gamma 0}-\log f_\gamma(0.02))/0.02 \quad (i)$$

where the meaning of each symbol in the above formula is as follows.

$f_{\gamma 0}$: Volume ratio of retained austenite present in a steel sheet member $f_\gamma(0.02)$: Volume ratio of retained austenite present in a steel sheet member after a true strain of 0.02 is applied to and unloaded from the member What governs whether retained austenite transforms under an applied strain is considered to be the amount of dissolved C in the retained austenite. Within the range of the content of Mn according to the present invention, there is a positive correlation between the amount of retained austenite and the amount of dissolved C. For example, when the amount of dissolved C is about 0.8%, the above value of k becomes about 15, and when the amount of dissolved C is about 0.2%, the above value of k becomes about 53.

The heat-treated steel sheet member according to the present invention is assumed to have a tensile strength of 1.4 GPa or higher and have a total elongation of 8.0% or higher. This is because, by having a tensile strength as high as 1.4 GPa or higher and having a ductility as excellent as a total elongation of 8.0% or higher, it is possible to meet a demand for establishing the compatibility between fuel efficiency and crash safety.

To achieve an excellent ductility and an enhanced crash safety as described above, it is desirable to increase not only uniform elongation but also local elongation. From such a viewpoint, the local elongation is preferably set at 2.8% or higher.

In the present invention, it is assumed that for the measurement of the above mechanical properties including the strain induced transformation parameter k, tensile strength, total elongation, and local elongation, use is made of a half-size sheet specimen of the ASTM standard E8. Specifically, a tension test is conducted in conformance with the specifications of ASTM standard E8, where a room temperature tension test is conducted on a sheet specimen having a thickness of 1.2 mm, a parallel portion length of 32 mm, and a parallel portion width of 6.25 mm, at a strain rate of 3 min/min, and a maximum strength (tensile strength) is measured. In addition, markings are made at 25 mm intervals in advance on a parallel portion of the tension test specimen, and an elongation percentage (total elongation) is measured with raptured samples abutted each other. Then, a local elongation is determined as a value obtained by subtracting a plastic strain at a maximum strength (uniform elongation) from the total elongation.

(E) Mn Segregation Degree of Heat-Treated Steel Sheet Member

Mn Segregation Degree α: 1.6 or Lower

α=[Maximum Mn concentration (mass %) at sheet-thickness center portion]/[Average Mn concentration (mass %) in ¼ sheet-thickness depth position from surface]   (ii)

In a center portion of a sheet-thickness cross section of a steel sheet, Mn is concentrated owing to the occurrence of center segregation. For this reason, MnS is concentrated in a center in the form of inclusions, and hard martensite is prone to be generated, which arises the risk that the difference in hardness occurs between the center and a surrounding portion, resulting in a degradation in toughness. In particular, when the value of α Mn segregation degree α, which is expressed by the above formula (ii), exceeds 1.6, toughness may be degraded. Therefore, to improve toughness, it is preferable to set the value of α of a heat-treated steel sheet member at 1.6 or lower. To further improve toughness, it is more preferable to set the value of a at 1.2 or lower.

The value of α does not change greatly by heat treatment or hot forming. Thus, by setting the value of α of a steel sheet for heat treatment within the above range, the value of α of the heat-treated steel sheet member can also be set at 1.6 or lower, that is, the toughness of the heat-treated steel sheet member can be enhanced.

The maximum Mn concentration in the sheet-thickness center portion is determined by the following method. The sheet-thickness center portion of a steel sheet is subjected to line analysis in a direction perpendicular to a thickness direction with an electron probe micro analyzer (EPMA), the three highest measured values are selected from the results of the analysis, and the average value of the measured values is calculated. The average Mn concentration in a ¼ sheet-thickness depth position from a surface is determined by the following method. Similarly, with an EPMA, 10 spots in the ¼ depth position of a steel sheet are subjected to analysis, and the average value thereof is calculated.

The segregation of Mn in a steel sheet is mainly controlled by the composition of the steel sheet, in particular, the content of impurities, and the condition of continuous casting, and remains substantially unchanged before and after hot rolling and hot forming. Therefore, by controlling the segregation situation of a steel sheet for heat treatment, it is possible to control the segregation situation of a steel sheet member subjected to heat treatment afterward, in the same manner.

(F) Cleanliness of Heat-Treated Steel Sheet Member

The index of cleanliness: 0.10% or lower

When a heat-treated steel sheet member including a lot of type A, type B, and type C inclusions described in JIS G 0555(2003), the inclusions causes a degradation in toughness. When the inclusions increase, crack propagation easily occurs, which raises the risk of a degradation in toughness. In particular, in the case of a heat-treated steel sheet member having a tensile strength of 1.4 GPa or higher, it is preferable to keep the abundance of the inclusions low. When the value of the index of cleanliness of steel specified in JIS G 0555(2003) exceeds 0.10%, which means a lot of inclusions, it is difficult to secure a practically sufficient toughness. For this reason, it is preferable to set the value of the index of cleanliness of a heat-treated steel sheet member preferably at 0.10% or lower. To further improve toughness, it is more preferable to set the value of the index of cleanliness at 0.06% or lower. The value of the index of cleanliness of steel is a value obtained by calculating the percentages of the areas occupied by the above type A, type B, and type C inclusions.

The value of the index of cleanliness does not change greatly by heat treatment or hot forming. Thus, by setting the value of the index of cleanliness of a steel sheet for heat treatment within the above range, the value of the index of cleanliness of a heat-treated steel sheet member can also be set at 0.10% or lower.

In the present invention, the value of the index of cleanliness of a steel sheet for heat treatment or a heat-treated steel sheet member can be determined by the following method. From a steel sheet for heat treatment or a heat-treated steel sheet member, specimens are cut off from at five spots. Then, in positions at ⅛t, ¼t, ½t, ¾t, and ⅞t sheet thicknesses of each specimen, the index of cleanliness is investigated by the point counting method. Of the values of the index of cleanliness at the respective sheet thicknesses, the largest numeric value (the lowest in cleanliness) is determined as the value of the index of cleanliness of the specimen.

(G) Surface Roughness of Steel Sheet for Heat Treatment

Maximum Height Roughness Rz: 3.0 to 10.0 µm

As to the surface roughness of a steel sheet for heat treatment to be a starting material before heat treatment for the heat-treated steel sheet member according to the present invention, no special limit is provided. However, to obtain a heat-treated steel sheet member excellent in scale adhesiveness property in hot forming, it is preferable to use a steel sheet that has a maximum height roughness Rz of 3.0 to 10.0 µm on its steel sheet surface, the maximum height roughness Rz being specified in JIS B 0601 (2013). By setting the maximum height roughness Rz of a steel sheet surface at 3.0 µm or higher, the anchor effect enhances a scale adhesiveness property in hot forming. Meanwhile, when the maximum height roughness Rz exceeds 10.0 µm, scales are left in the stage of scale removing treatment such as shotblast in some cases, which causes an indentation defect.

By setting the maximum height roughness Rz on the surface of a steel sheet at 3.0 to 10.0 µm, it is possible to establish the compatibility between scale adhesiveness property in pressing and scale peeling property in shotblasting. To obtain an appropriate anchor effect as described above, control using an arithmetic average roughness Ra is insufficient, and the use of the maximum height roughness Rz is needed.

In the case where hot forming is performed on a steel sheet having a maximum height roughness Rz of 3.0 pan or higher on its steel sheet surface, the ratio of wustite, which is an iron oxide, formed on the surface tends to increase. Specifically, a ratio of wustite of 30 to 70% in area percent provides an excellent scale adhesiveness property.

The wustite is more excellent in plastic deformability at high temperature than hematite and magnetite, and is considered to present a feature in which, when a steel sheet undergoes plastic deformation during hot forming, scales are likely to undergo plastic deformation. Although the reason that the ratio of wustite increases is unknown clearly, it is considered that the area of scale-ferrite interface increases in the presence of unevenness, and the outward diffusion of iron ions is promoted in oxidation, whereby the wustite, which is high in iron ratio, increases.

In addition, as mentioned before, containing Si causes $Fe_2SiO_4$ to be generated on a steel sheet surface during hot forming, so that the generation of scales is inhibited. It is considered that the total scale thickness becomes small, and the ratio of wustite in scales increases, whereby the scale adhesiveness property in hot forming is enhanced. Specifically, a scale thickness being 5 µm or smaller provides an excellent scale adhesiveness property.

(H) Method for Producing Steel Sheet for Heat Treatment

As to the conditions for producing a steel sheet for heat treatment that is a steel sheet before heat treatment to be a heat-treated steel sheet member according to the present invention, no special limit is provided. However, the use of the following producing method enables the production of a steel sheet for heat treatment having the steel micro-structure mentioned above. The following producing method involves, for example, performing hot rolling, pickling, cold rolling, and annealing treatment.

A steel having the chemical composition mentioned above is melted in a furnace, and thereafter, a slab is fabricated by casting. At this point, to inhibit the concentration of MnS, which serves as a start point of delayed fracture, it is desirable to perform center segregation reducing treatment, which reduces the center segregation of Mn. As the center segregation reducing treatment, there is a method to discharge a molten steel in which Mn is concentrated in an unsolidified layer before a slab is completely solidified.

Specifically, by performing treatment including electromagnetic stirring and unsolidified layer rolling, it is possible to discharge a molten steel in which Mn before completely solidified is concentrated. The above electromagnetic stirring treatment can be performed by giving fluidity to an unsolidified molten steel at 250 to 1000 gauss, and the unsolidified layer rolling treatment can be performed by subjecting a final solidified portion to the rolling at a gradient of about 1 mm/m.

On the slab obtained by the above method, soaking treatment may be performed as necessary. By performing the soaking treatment, it is possible to diffuse the segregated Mn, decreasing segregation degree. A preferable soaking temperature for performing the soaking treatment is 1200 to 1300° C., and a soaking time period is 20 to 50 hours.

To set the index of cleanliness of a steel sheet at 0.10% or lower, when a molten steel is subjected to continuous casting, it is desirable to use a heating temperature of the molten steel higher than the liquidus temperature of the steel by 5° C. or higher and the casting amount of the molten steel per unit time of 6 t/min or smaller.

If the casting amount of molten steel per unit time exceeds 6 t/min during continuous casting, the fluidity of the molten steel in a mold is higher and inclusions are more easily captured in a solidified shell, whereby inclusions in a slab increases. In addition, if the molten steel heating temperature is lower than the temperature higher than the liquidus temperature by 5° C., the viscosity of the molten steel increases, which makes inclusions difficult to float in a continuous casting machine, with the result that inclusions in a slab increase, and cleanliness is likely to be degraded.

Meanwhile, by performing casting at a molten steel heating temperature higher than the liquidus temperature of the molten steel by 5° C. or higher with the casting amount of the molten steel per unit time of 6 t/min or smaller, inclusions are less likely to be brought in a slab. As a result, the amount of inclusions in the stage of fabricating the slab can be effectively reduced, which allows an index of cleanliness of a steel sheet of 0.10% or lower to be easily achieved.

In continuous casting on a molten steel, it is desirable to use a molten steel heating temperature of the molten steel higher than the liquidus temperature by 8° C. or higher and the casting amount of the molten steel per unit time of 5 t/min or smaller. A molten steel heating temperature higher than the liquidus temperature by 8° C. or higher and the casting amount of the molten steel per unit time of 5 t/min or smaller are desirable because the index of cleanliness of 0.06% or lower can easily be achieved.

Subsequently, the above slab is subjected to hot rolling. The conditions for hot rolling is preferably provided as those where a hot rolling start temperature is set at within a temperature range from 1000 to 1300° C., and a hot rolling completion temperature is set at 950° C. or higher, from the viewpoint of generating carbides more uniformly.

In a hot rolling step, rough rolling is performed, and descaling is thereafter performed as necessary, and finish rolling is finally performed. At this point, when the time period between terminating the rough rolling to starting the finish rolling is set at 10 seconds or shorter, the recrystallization of austenite is inhibited. As a consequence, it is possible to inhibit the growth of carbides, inhibit scales generated at a high temperature, inhibit the oxidation of austenite grain boundaries, and adjust a maximum height roughness on the surface of a steel sheet within an appropriate range. Moreover, the inhibition of the generation of scales and the oxidation of grain boundaries makes Si present in an outer layer prone to be left dissolved, and thus it is considered that fayalite is likely to be generated during heating in press working, whereby wustite is also likely to be generated.

As to a winding temperature after the hot rolling, the higher it is, the more favorable it is from the viewpoint of workability. However, an excessively high winding temperature results in a decrease in yield owing to the generation of scales. Therefore, the winding temperature is preferably set at 500 to 650° C. In addition, a lower winding temperature causes carbides to be dispersed finely and decreases the number of the carbide.

The form of carbide can be controlled by adjusting the conditions for the hot rolling as well as the conditions for subsequent annealing. In other words, it is desirable to use a higher annealing temperature so as to once dissolve carbide in the stage of the annealing, and to cause the carbide to transform at a low temperature. Since carbide is hard, the form thereof does not change in cold rolling, and the existence form thereof after the hot rolling is also kept after the cold rolling.

The hot-rolled steel sheet obtained through the hot rolling is subjected to descaling treatment by pickling or the like. To adjust the maximum height roughness on the surface of the steel sheet within an appropriate range, it is desirable to adjust the amount of scarfing in a pickling step. A smaller amount of scarfing increases the maximum height roughness. On the other hand, a larger amount of scarfing decreases the maximum height roughness. Specifically, the amount of scarfing by the pickling is preferably set at 1.0 to 15.0 μm, more preferably 2.0 to 10.0 μm.

As the steel sheet for heat treatment according to the present invention, use can be made of a hot-rolled steel sheet or a hot-rolled-annealed steel sheet, or a cold-rolled steel sheet or a cold-rolled-annealed steel sheet. A treatment step may be selected, as appropriate, in accordance with the sheet-thickness accuracy request level or the like of a product.

That is, a hot-rolled steel sheet subjected to descaling treatment is subjected to annealing to be made into a hot-rolled-annealed steel sheet, as necessary. In addition, the above hot-rolled steel sheet or hot-rolled-annealed steel sheet is subjected to cold rolling to be made into a cold-rolled steel sheet, as necessary. Furthermore, the cold-rolled steel sheet is subjected to annealing to be made into a cold-rolled-annealed steel sheet, as necessary. If the steel sheet to be subjected to cold rolling is hard, it is preferable to perform annealing before the cold rolling to increase the workability of the steel sheet to be subjected to the cold rolling.

The cold rolling may be performed using a normal method. From the viewpoint of securing a good flatness, a rolling reduction in the cold rolling is preferably set at 30% or higher. Meanwhile, to avoid a load being excessively heavy, the rolling reduction in the cold rolling is preferably set at 80% or lower. In the cold rolling, the maximum height roughness on the surface of a steel sheet does not change largely.

In the case where an annealed-hot-rolled steel sheet or an annealed-cold-rolled steel sheet is produced as the steel sheet for heat treatment, a hot-rolled steel sheet or a cold-rolled steel sheet is subjected to annealing. In the annealing, the hot-rolled steel sheet or the cold-rolled steel sheet is retained within a temperature range from, for example, 550 to 950° C.

By setting the temperature for the retention in the annealing at 550° C. or higher, in both cases of producing the annealed-hot-rolled steel sheet or the annealed-cold-rolled steel sheet, the difference in properties with the difference in conditions for the hot rolling is reduced, and properties after quenching can be further stabilized. In the case where the annealing of the cold-rolled steel sheet is performed at 550° C. or higher, the cold-rolled steel sheet is softened owing to recrystallization, and thus the workability can be enhanced. In other words, it is possible to obtain an annealed-cold-rolled steel sheet having a good workability. Consequently, the temperature for the retention in the annealing is preferably set at 550° C. or higher.

On the other hand, if the temperature for the retention in the annealing exceeds 950° C., a steel micro-structure may undergo grain coarsening. The grain coarsening of a steel micro-structure may decrease a toughness after quenching. In addition, even if the temperature for the retention in the annealing exceeds 950° C., an effect brought by increasing the temperature is not obtained, only resulting in a rise in cost and a decrease in productivity. Consequently, the temperature for the retention in the annealing is preferably set at 950° C. or lower.

After the annealing, cooling is preferably performed down to 550° C. at an average cooling rate of 3 to 20° C./s. By setting the above average cooling rate at 3° C./s or higher, the generation of coarse pearlite and coarse cementite is inhibited, the properties after quenching can be enhanced. In addition, by setting the above average cooling rate at 20° C./s or lower, the occurrence of unevenness in strength and the like is inhibited, which facilitates the stabilization of the material quality of the annealed-hot-rolled steel sheet or the annealed-cold-rolled steel sheet.

(I) Method for Producing Heat-Treated Steel Sheet Member

By performing heat treatment on the above steel sheet for heat treatment, it is possible to obtain a heat-treated steel sheet member that has a high strength and is excellent in toughness and ductility. As to the conditions for the heat treatment, although no special limit is provided, heat treatment including, for example, the following heating step and cooling step in this order can be performed.

Heating Step

A steel sheet is heated at an average temperature rise rate of 5° C./s or higher, up to a temperature range from the $Ac_3$ point to the $Ac_3$ point+200° C. Through this heating step, the steel micro-structure of the steel sheet is turned into a single austenite phase. In the heating step, an excessively low rate of temperature increase or an excessively high heating temperature causes γ grains to be coarsened, which raises the risk of a degradation in strength of a steel sheet member after cooling. In contrast to this, by performing a heating step satisfying the above condition, it is possible to prevent a degradation in strength of a heat-treated steel sheet member.

Cooling Step

The steel sheet that underwent the above heating step is cooled from the above temperature range down to the Ms point at the upper critical cooling rate or higher so that diffusional transformation does not occur (that is, ferrite does not precipitate), and cooled from the Ms point down to 100° C. at an average cooling rate of 5° C./s or lower. As to a cooling rate from a temperature of less than 100° C. to a room temperature, a cooling rate to the point of that of air cooling is preferable. By performing a cooling step satisfying the above condition, it is possible to prevent ferrite from being produced in a cooling process, and within a temperature range of the Ms point or lower, carbon is diffused and concentrated in untransformed austenite owing to automatic temper, which generates retained austenite that is stable against plastic deformation. It is thereby possible to obtain a heat-treated steel sheet member that is excellent in toughness and ductility.

The upper critical cooling rate is greatly influenced by the content of Mn. Within the range of the content of Mn specified in the present invention, the upper critical cooling rate is about 1 to 30° C./s. For the formation of a steel micro-structure, the lower limit of an average cooling rate down to the Ms point may be 1° C./s for some component of a steel sheet. However, from the standpoint of formation of scales, a cooling rate to some extent is needed, and the cooling rate may be set at, for example, 10° C./s or higher, or may be set at 45° C./s or higher, as will be exemplified in Examples.

In addition, as mentioned before, the maximum height roughness Rz of a steel sheet is adjusted to 3.0 to 10.0 μm. A maximum height roughness Rz of lower than 3.0 μm leads to a decrease in adhesiveness property of scales in the processes of heating, working, and cooling, which causes the scales to peel off partially, resulting in a great variation in cooling rate. A maximum height roughness Rz of higher than 10.0 μm also results in a great variation in cooling rate owing to the unevenness profile of the surface. As seen from the above, by adjusting the maximum height roughness Rz to 3.0 to 10.0 μm, the control of temperature is enhanced, and a variation in properties of a product is reduced.

The above heat treatment can be performed by any method, and may be performed by, for example, high-frequency heating quenching. In the heating step, a time period for retaining a steel sheet within a temperature range from the $Ac_3$ point to the $Ac_3$ point+200° C. is preferably set at 10 seconds or longer from the viewpoint of increasing the hardenability of steel by fostering austenite transformation to melt carbide. In addition, the above retention time period is preferably set at 600 seconds or shorter from the viewpoint of productivity.

As a steel sheet to be subjected to the heat treatment, use may be made of an annealed-hot-rolled steel sheet or an annealed-cold-rolled steel sheet that is obtained by subjecting a hot-rolled steel sheet or a cold-rolled steel sheet to annealing treatment.

In the above heat treatment, after the heating to the temperature range from the $Ac_3$ point to the $Ac_3$ point+200° C. and before the cooling down to the Ms point, hot forming such as the hot stamping mentioned before may be performed. As the hot forming, there is bending, swaging, bulging, hole expansion, flanging, and the like. In addition, if there is provided means for cooling a steel sheet simultaneously with or immediately after the forming, the present invention may be applied to a molding method other than press forming, for example, roll forming.

Hereinafter, the present invention will be described more specifically by way of examples, but the present invention is not limited to these examples.

EXAMPLE

Steels having the chemical compositions shown in Table 1 were melted in a test converter, subjected to continuous casting by a continuous casting test machine, and fabricated into slabs having a width of 1000 mm and a thickness of 250 mm. At this point, under the conditions shown in Table 2, the heating temperatures of molten steels and the casting amounts of the molten steels per unit time were adjusted.

TABLE 1

| Steel No. | Chemical composition (by mass %, balance: Fe and impurities) | | | | | | | | | | | | | | | | |
|---|---|---|---|---|---|---|---|---|---|---|---|---|---|---|---|---|---|
| | C | Si | Mn | P | S | N | Ti | B | Cr | Ni | Cu | Mo | V | Ca | Al | Nb | REM |
| 1 | 0.21 | 1.80 | 2.10 | 0.013 | 0.0016 | 0.0030 | 0.018 | 0.0021 | — | — | — | — | — | — | — | — | — |
| 2 | 0.22 | 2.10 | 1.90 | 0.011 | 0.0015 | 0.0030 | 0.020 | 0.0020 | — | — | — | — | — | — | — | — | — |
| 3 | 0.20 | 2.00 | 2.00 | 0.012 | 0.0018 | 0.0032 | 0.015 | 0.0022 | — | — | — | — | — | 0.002 | — | — | — |
| 4 | 0.28 | 0.60 | 1.60 | 0.011 | 0.0016 | 0.0026 | 0.016 | 0.0024 | 0.11 | — | — | 0.2 | — | — | 0.03 | — | 0.003 |
| 5 | 0.17 | 3.50 | 2.50 | 0.009 | 0.0012 | 0.0031 | 0.016 | 0.0031 | 0.12 | — | — | — | 0.2 | — | — | 0.1 | — |
| 6 | 0.15 | 2.50 | 3.50 | 0.016 | 0.0021 | 0.0035 | 0.020 | 0.0025 | 0.08 | 0.3 | 0.1 | — | — | — | — | — | — |
| 7 | 0.20 | 2.50 | 2.50 | 0.012 | 0.0014 | 0.0031 | 0.021 | 0.0026 | 0.31 | 0.1 | — | — | — | — | — | 0.05 | — |
| 8 | 0.25 | 2.00 | 1.60 | 0.008 | 0.0011 | 0.0032 | 0.025 | 0.0028 | 0.15 | — | 0.1 | — | — | — | — | — | — |
| 9 | 0.23 | 1.50 | 2.20 | 0.011 | 0.0009 | 0.0032 | 0.025 | 0.0029 | 0.14 | — | — | 0.1 | — | — | — | — | 0.001 |
| 10 | 0.21 | 1.80 | 2.50 | 0.010 | 0.0009 | 0.0032 | 0.021 | 0.0028 | 0.12 | 0.1 | 0.1 | — | — | — | — | — | — |
| 11 | 0.27 | 0.20* | 2.30 | 0.009 | 0.0016 | 0.0036 | 0.022 | 0.0031 | 0.21 | — | — | — | — | 0.001 | 0.06 | — | — |
| 12 | 0.26 | 0.30* | 0.60* | 0.016 | 0.0018 | 0.0031 | 0.023 | 0.0021 | 0.31 | 0.2 | — | 0.2 | — | — | 0.07 | — | — |
| 13 | 0.21 | 2.00 | 2.00 | 0.011 | 0.0018 | 0.0033 | 0.020 | 0.0025 | 0.01 | — | — | — | — | 0.001 | — | — | — |
| 14 | 0.21 | 2.00 | 2.00 | 0.011 | 0.0018 | 0.0033 | 0.020 | 0.0025 | 0.01 | — | — | — | — | 0.001 | — | — | — |

TABLE 1-continued

| Steel | Chemical composition (by mass %, balance: Fe and impurities) | | | | | | | | | | | | | | | | |
|---|---|---|---|---|---|---|---|---|---|---|---|---|---|---|---|---|---|
| No. | C | Si | Mn | P | S | N | Ti | B | Cr | Ni | Cu | Mo | V | Ca | Al | Nb | REM |
| 15 | 0.21 | 2.00 | 2.00 | 0.011 | 0.0018 | 0.0033 | 0.020 | 0.0025 | 0.01 | — | — | — | — | 0.001 | — | — | — |
| 16 | 0.21 | 2.00 | 2.00 | 0.011 | 0.0018 | 0.0033 | 0.020 | 0.0025 | 0.01 | — | — | — | — | 0.001 | — | — | — |
| 17 | 0.21 | 2.00 | 2.00 | 0.011 | 0.0018 | 0.0033 | 0.020 | 0.0025 | 0.01 | — | — | — | — | 0.001 | — | — | — |
| 18 | 0.25 | 0.48* | 3.50 | 0.015 | 0.0016 | 0.0030 | 0.020 | 0.0029 | 0.15 | — | — | — | 0.1 | — | — | — | — |

*indicates that conditions do not satisfy those defined by the present invention.

The cooling rate of the slabs was controlled by changing the volume of water in a secondary cooling spray zone. The center segregation reducing treatment was performed in such a manner that subjects a portion of solidification end to soft reduction using a roll at a gradient of 1 mm/m, so as to discharge concentrated molten steel in a final solidified portion. Some of the slabs were thereafter subjected to soaking treatment under conditions at 1250° C. for 24 hours.

The resultant slabs were subjected to the hot rolling by a hot rolling test machine and made into hot-rolled steel sheets having a thickness of 3.0 mm. In the hot rolling step, descaling was performed after rough rolling, and finish rolling was finally performed. Subsequently, the above hot-rolled steel sheets were pickled in a laboratory. Further, the hot-rolled steel sheets were subjected to cold rolling in a cold-rolling test machine and made into cold-rolled steel sheets having a thickness of 1.4 mm, whereby steel sheets for heat treatment (steels No. 1 to 18) were obtained.

The obtained steel sheets for heat treatment were measured in terms of maximum height roughness, arithmetic average roughness, the number density of carbide, Mn segregation degree, and the index of cleanliness. In the present invention, to measure the maximum height roughness Rz and the arithmetic average roughness Ra, a maximum height roughness Rz and an arithmetic average roughness Ra in a 2 mm segment were measured at 10 spots in each of a rolling direction and a direction perpendicular to the rolling direction, using a surface roughness tester, and the average value thereof was adopted.

To determine the number density of carbide having circle-equivalent diameters of 0.1 μm or larger, the surface of a steel sheet for heat treatment was etched using a picral solution, magnified 2000 times under a scanning electron microscope, and observed in a plurality of visual fields. At this point, the number of visual fields where carbides having circle-equivalent diameters of 0.1 μm or larger were present was counted, and a number per 1 mm² was calculated.

The measurement of Mn segregation degree was performed in the following procedure. The sheet-thickness middle portion of a steel sheet for heat treatment was subjected to line analysis in a direction perpendicular to a thickness direction with an EPMA, the three highest measured values were selected from the results of the analysis, and thereafter the average value of the measured values was calculated, whereby the maximum Mn concentration of the sheet-thickness center portion was determined. In addition, with an EPMA, 10 spots in the ¼ depth position of the sheet thickness from the surface of a steel sheet for heat treatment were subjected to analysis, and the average values of the analysis was calculated, whereby the average Mn concentration at the ¼ depth position of the sheet thickness from the surface was determined. Then, by dividing the above maximum Mn concentration of the sheet-thickness center portion by the average Mn concentration at the ¼ depth position of the sheet thickness from the surface, the Mn segregation degree α was determined.

The index of cleanliness was measured in positions at ⅛t, ¼t, ½t, ¾t, and ⅞t sheet thicknesses, by the point counting method. Then, of the values of the index of cleanliness at the respective sheet thicknesses, the largest numeric value (the lowest in the index of cleanliness) was determined as the value of the index of cleanliness of steel sheet.

As mentioned above, since the Mn segregation degree and the value of the index of cleanliness do not change greatly by the hot forming, the above Mn segregation degree α and value of the index of cleanliness were determined as the Mn segregation degree α and the value of the index of cleanliness, of a heat-treated steel sheet member.

Table 2 also shows the measurement results of the presence/absence of the center segregation reducing treatment and soaking treatment in the producing step of steel sheets for heat treatment, a time from the termination of the rough rolling to the start of the finish rolling in the hot rolling step, the hot rolling completion temperature and the winding temperature of a hot-rolled steel sheet, the amount of scarfing by the pickling, as well as, the maximum height roughness Rz, arithmetic average roughness Ra, and number density of carbide of a steel sheet for heat treatment. Table 4 to be described later shows the measurement results of the Mn segregation degree α and the index of cleanliness.

TABLE 2

| Steel No. | Liquidus temperature (° C.) | Molten steel heating temperature (° C.) | Casting amount of molten steel (t/min) | Center segregation reducing treatment | Soaking treatment | Time from termination of rough rolling to start of finish rolling (s) | Hot rolling completion temperature (° C.) | Winding temperature (° C.) | Amount of scarfing (μm) | Maximum height roughness Rz (μm) | Arithmetic average roughness Ra (μm) | Number density of carbide (/mm²) |
|---|---|---|---|---|---|---|---|---|---|---|---|---|
| 1 | 1505 | 1540 | 3.2 | presence | absence | 8 | 970 | 550 | 7.2 | 6.0 | 1.2 | 7.3 × 10³ |
| 2 | 1506 | 1508 | 3.2 | absence | absence | 7 | 960 | 550 | 7.3 | 6.2 | 1.2 | 7.4 × 10³ |

TABLE 2-continued

| Steel No. | Liquidus temperature (° C.) | Molten steel heating temperature (° C.) | Casting amount of molten steel (t/min) | Center segregation reducing treatment | Soaking treatment | Time from termination of rough rolling to start of finish rolling (s) | Hot rolling completion temperature (° C.) | Winding temperature (° C.) | Amount of scarfing (μm) | Maximum height roughness Rz (μm) | Arithmetic average roughness Ra (μm) | Number density of carbide (/mm²) |
|---|---|---|---|---|---|---|---|---|---|---|---|---|
| 3 | 1503 | 1542 | 3.1 | presence | absence | 8 | 980 | 550 | 7.1 | 6.2 | 1.0 | 7.5 × 10³ |
| 4 | 1505 | 1530 | 3.2 | presence | absence | 7 | 980 | 540 | 11.2 | 3.9 | 0.4 | 7.3 × 10³ |
| 5 | 1504 | 1521 | 2.6 | presence | absence | 8 | 970 | 550 | 3.1 | 8.2 | 2.1 | 7.4 × 10³ |
| 6 | 1506 | 1533 | 3.4 | presence | absence | 8 | 990 | 530 | 6.1 | 7.6 | 1.4 | 7.2 × 10³ |
| 7 | 1508 | 1537 | 2.6 | absence | 1250° C. × 24 h | 6 | 980 | 560 | 6.1 | 7.2 | 1.5 | 7.5 × 10³ |
| 8 | 1506 | 1547 | 2.9 | absence | 1250° C. × 24 h | 7 | 990 | 550 | 7.2 | 6.2 | 1.1 | 7.4 × 10³ |
| 9 | 1506 | 1508 | 3.5 | absence | absence | 7 | 980 | 550 | 9.1 | 5.0 | 1.0 | 7.1 × 10³ |
| 10 | 1506 | 1540 | 7.4 | absence | absence | 7 | 980 | 540 | 7.9 | 5.6 | 1.1 | 7.2 × 10³ |
| 11 | 1500 | 1532 | 3.6 | presence | absence | 8 | 990 | 550 | 12.5 | 2.0 | 0.2 | 7.5 × 10³ |
| 12 | 1514 | 1568 | 4.2 | presence | absence | 6 | 980 | 560 | 12.1 | 2.4 | 0.2 | 7.5 × 10³ |
| 13 | 1502 | 1530 | 3.1 | presence | absence | 7 | 980 | 550 | 0.2 | 13.1 | 1.1 | 7.5 × 10³ |
| 14 | 1502 | 1535 | 3.1 | presence | absence | 7 | 980 | 540 | 18.9 | 2.4 | 0.3 | 7.4 × 10³ |
| 15 | 1502 | 1532 | 3.2 | presence | absence | 7 | 990 | 550 | 0.9 | 11.1 | 1.5 | 7.5 × 10³ |
| 16 | 1502 | 1540 | 3.1 | presence | absence | 18 | 960 | 560 | 7.1 | 2.6 | 0.2 | 9.7 × 10³ |
| 17 | 1502 | 1536 | 3.1 | presence | absence | 15 | 840 | 550 | 7.1 | 2.4 | 1.0 | 9.6 × 10³ |
| 18 | 1507 | 1538 | 4.0 | presence | absence | 8 | 990 | 700 | 11.5 | 2.2 | 0.3 | 9.8 × 10³ |

Subsequently, two samples having a thickness: 1.4 mm, a width: 30 mm, and a length: 200 mm were extracted from each of the above steel sheets. One of the extracted samples was subjected to energization heating and cooling under the heat treatment conditions shown in Table 3 below that simulates the hot forming. Table 3 also shows the $Ac_3$ point and Ms point of each steel sheet. After the cooling, a soaked region of each sample was cut off and subjected to a tension test, a Charpy impact test, an X-ray diffraction test, and microscopic observation.

The tension test was conducted in conformance with the specifications of the ASTM standards E8 with a tension test machine from Instron. The above heat-treated samples were ground to have a thickness of 1.2 mm, and thereafter, half-size sheet specimens according to the ASTM standards E8 (parallel portion length: 32 mm, parallel portion width: 6.25 mm) were extracted so that a testing direction is parallel to their rolling directions. Note that, with the energization heating device and the cooling device used in this Example, only a limited soaked region is obtained from a sample having a length of about 200 mm, and thus it was decided to adopt the half-size sheet specimen according to the ASTM standards E8.

Then, each of the specimens was attached with a strain gage (KFG-5 from Kyowa Electronic Instruments Co., Ltd., gage length: 5 mm) and subjected to a room temperature tension test at a strain rate of 3 mm/min, whereby a maximum strength (tensile strength) was measured. In addition, markings were made at 25 mm intervals in advance on a parallel portion of the tension test specimen, and an elongation percentage (total elongation) was measured with raptured samples abutted each other. Then, a local elongation was determined as a value obtained by subtracting a plastic strain at a maximum strength (uniform elongation) from the total elongation.

In the Charpy impact test, a V-notched specimen was fabricated by stacking three soaked regions that were ground until having a thickness of 1.2 mm, and this specimen was subjected to the Charpy impact test to determine an impact value at −80° C. In the present invention, the case where the impact value was 40 J/cm² or higher was evaluated to be excellent in toughness.

In the X-ray diffraction test, use was made of a specimen (thickness 1.1 mm) obtained by subjecting the surface of the above heat-treated sample to chemical polishing using hydrofluoric acid and hydrogen peroxide water, up to a depth of 0.1 mm. Specifically, the specimen after the chemical polishing was measured using a Co tube within a range from 45° to 105° in terms of 2θ. From the resultant X-ray diffraction spectrum, the retained austenite volume ratio $f_{\gamma 0}$ was determined.

In addition, the above heat-treated sample was worked into the above tensile test specimen, and a certain plastic strain (true strain: ε=0.02) was applied to and unloaded from the tensile test specimen, from which the above specimen for X-ray diffraction was fabricated, and the retained austenite volume ratio $f_\gamma(0.02)$ was determined. From these volume ratios, the strain induced transformation parameter k expressed by the following formula (i) was calculated and used as the index of an increase in ductility by the TRIP effect. Since with larger k, the retained austenite transforms with a lower strain, the prevention of necking with a high strain, that is, an increase in ductility by the TRIP effect cannot be expected.

$$k = (\log f_{\gamma 0} - \log f_\gamma(0.02))/0.02 \qquad (i)$$

where the meaning of each symbol in the above formula is as follows.

$f_{\gamma 0}$: Volume ratio of retained austenite present in a steel sheet member $f_\gamma(0.02)$: Volume ratio of retained austenite present in a steel sheet member after a true strain of 0.02 is applied to and unloaded from the member Further, the surface of the above heat-treated sample was subjected to specular working, thereafter etched using a picral solution, magnified 2000 times under a scanning electron microscope, and observed in a plurality of visual fields. At this point, the number of visual fields where retained carbides having circle-equivalent diameters of 0.1 µm or larger were present was counted, and a number per 1 mm$^2$ was calculated. In addition, the surface of the above heat-treated sample was subjected to specular working, and thereafter subjected to Nital etching. Then, the steel microstructure thereof was observed under an optical microscope, the area fraction of martensite being a main steel microstructure was measured, and the value of the area fraction was determined as the volume ratio of the martensite.

In addition, the other of the extracted samples was subjected to energization heating under the heat treatment conditions shown in Table 3 below that simulates the hot forming, thereafter subjected to bending in its soaked region, and thereafter subjected to cooling. After the cooling, the region of each sample on which the bending was performed was cut off and subjected to the scale property evaluation test. In performing the bending, U-bending was performed in which, a jig of R10 mm was pushed from above against the vicinity of the middle of the sample in its longitudinal direction, with both ends of the sample supported with supports. The interval between the supports was set at 30 mm.

The scale property evaluation test was conducted in such a manner as to divide the test into the evaluation of scale adhesiveness property and the evaluation of scale peeling property, the scale adhesiveness property serving as an index of whether scales do not peel and fall off during pressing, the scale peeling property serving as an index of whether scales are easily peeled off and removed by shotblasting or the like. First, whether peeling occurs by the bending after the energization heating was observed, and the evaluation of scale adhesiveness property was conducted based on the following criteria. In the present invention, the case where a result is "◯◯" or "⊖" was determined to be excellent in scale adhesiveness property.

◯◯: No peeled pieces fell off
◯: 1 to 5 peeled pieces fell off
x: 6 to 20 peeled pieces fell off
xx: 21 or more peeled pieces fell off Subsequently, samples other than those which were evaluated to be "xx" in the above evaluation of scale adhesiveness property were further subjected to a tape peeling test in which adhesive tape was attached to and detached from the region subjected to the bending. Afterward, whether scales were adhered to the tape and easily peeled off was observed, and the evaluation of scale peeling property was conducted based on the following criteria. In the present invention, the case where a result is "◯◯" or "◯" was determined to be excellent in scale peeling property. Then, the case of being excellent in both the scale adhesiveness property and the scale peeling property was determined to be excellent in scale property during the hot forming.

◯◯: All scales were peeled off
◯: 1 to 5 peeled pieces remained
x: 6 to 20 peeled pieces remained
xx: 21 or more peeled pieces remained

TABLE 3

| | | Transformation point | | Heating step | | | Cooling step | |
|---|---|---|---|---|---|---|---|---|
| | | | | | | | | Cooling rate within a range |
| | | | | Temperature | Heating | Retention | Cooling rate | of Ms point |
| Test No. | Steel No. | Ac$_3$ (° C.) | Ms (° C.) | rise rate (° C./s) | temperature (° C.) | time (s) | to Ms point (° C./s) | or lower (° C./s) |
| 1 | 1 | 917 | 392 | 12 | 950 | 240 | 80 | 2.0 |
| 2 | 2 | 916 | 393 | 12 | 950 | 230 | 80 | 2.0 |
| 3 | 3 | 915 | 388 | 12 | 950 | 220 | 79 | 1.0 |
| 4 | | | | 26 | 950 | 200 | 45 | 2.0 |
| 5 | | | | 5 | 950 | 180 | 66 | 4.8 |
| 6 | | | | 20 | 950 | 200 | 76 | 12.0 |
| 7 | | | | 16 | 950 | 200 | 58 | 20.0 |
| 8 | | | | 19 | 950 | 200 | 72 | 150.0 |
| 9 | | | | 2 | 1150 | 200 | 80 | 5.0 |
| 10 | 4 | 828 | 394 | 10 | 900 | 150 | 80 | 2.5 |
| 11 | 5 | 1006 | 369 | 30 | 1020 | 200 | 79 | 3.1 |
| 12 | 6 | 927 | 339 | 4 | 950 | 150 | 90 | 3.8 |
| 13 | 7 | 935 | 358 | 16 | 950 | 200 | 79 | 1.2 |
| 14 | | | | 14 | 950 | 160 | 59 | 2.3 |
| 15 | | | | 19 | 950 | 160 | 65 | 3.4 |
| 16 | | | | 26 | 950 | 160 | 45 | 4.1 |
| 17 | | | | 22 | 950 | 160 | 77 | 321.0 |
| 18 | | | | 3 | 1150 | 160 | 65 | 3.9 |
| 19 | 8 | 924 | 394 | 26 | 950 | 150 | 66 | 1.5 |
| 20 | | | | 19 | 950 | 140 | 82 | 1.8 |
| 21 | | | | 16 | 950 | 140 | 43 | 2.5 |
| 22 | | | | 14 | 950 | 140 | 69 | 4.0 |
| 23 | | | | 17 | 950 | 140 | 66 | 405.0 |
| 24 | | | | 4 | 1200 | 140 | 55 | 2.5 |
| 25 | 9 | 873 | 369 | 29 | 880 | 150 | 78 | 2.6 |
| 26 | 10 | 880 | 361 | 15 | 900 | 150 | 80 | 3.9 |
| 27 | 11* | 780 | 358 | 10 | 900 | 150 | 98 | 4.1 |
| 28 | 12* | 836 | 419 | 10 | 900 | 200 | 86 | 4.5 |
| 29 | 13 | 913 | 385 | 10 | 950 | 200 | 80 | 1.2 |
| 30 | 14 | 913 | 385 | 10 | 950 | 200 | 80 | 1.2 |
| 31 | 15 | 913 | 385 | 10 | 950 | 200 | 80 | 1.2 |
| 32 | 16 | 913 | 385 | 10 | 950 | 200 | 80 | 1.2 |

TABLE 3-continued

| | | Transformation point | | Heating step | | | Cooling step | |
|---|---|---|---|---|---|---|---|---|
| | | | | Temperature | Heating | Retention | Cooling rate | Cooling rate within a range of Ms point |
| Test No. | Steel No. | $Ac_3$ (° C.) | Ms (° C.) | rise rate (° C./s) | temperature (° C.) | time (s) | to Ms point (° C./s) | or lower (° C./s) |
| 33 | 17 | 913 | 385 | 10 | 950 | 200 | 80 | 390.0 |
| 34 | 18* | 850 | 420 | 35 | 920 | 5 | 70 | 2.8 |

*indicates that conditions do not satisfy those defined by the present invention.

Table 4 shows the results of the tension test, the Charpy impact test, the X-ray diffraction test, the microscopic observation, and the scale property evaluation test.

TABLE 4

| Test No. | Steel No. | Volume ratio of retained γ (vol. %) | Volume ratio of martensite (vol. %) | Number density of retained carbide (/mm²) | Mn segregation degree α | Index of cleanliness (%) | k value | Tensile strength (MPa) | Total elongation (%) | Local elongation (%) | TS × EL (MPa·%) | Impact value (J/cm²) | Scale adhesiveness property | Scale peeling property | |
|---|---|---|---|---|---|---|---|---|---|---|---|---|---|---|---|
| 1 | 1 | 6.7 | 93 | 3.2 × 10³ | 0.5 | 0.03 | 9.0 | 1650 | 10.2 | 3.2 | 16830 | 59 | ⊚ | ○ | Inventive example |
| 2 | 2 | 6.8 | 93 | 3.2 × 10³ | 1.8 | 0.12 | 8.6 | 1658 | 10.5 | 2.9 | 17409 | 44 | ⊚ | ○ | |
| 3 | 3 | 7.7 | 92 | 3.1 × 10³ | 0.4 | 0.02 | 4.0 | 1650 | 11.8 | 3.2 | 19470 | 58 | ⊚ | ○ | |
| 4 | | 6.6 | 91 | 3.4 × 10³ | 0.4 | 0.02 | 10.0 | 1674 | 10.7 | 3.5 | 17915 | 56 | ⊚ | ○ | |
| 5 | | 5.6 | 92 | 3.4 × 10³ | 0.4 | 0.02 | 16.8 | 1742 | 9.6 | 3.0 | 16723 | 55 | ⊚ | ○ | |
| 6 | | 4.0* | 93 | 3.3 × 10³ | 0.4 | 0.02 | 22.2* | 1722 | 7.8* | 2.8 | 13432 | 48 | ⊚ | ○ | Comparative example |
| 7 | | 3.3* | 94 | 3.1 × 10³ | 0.4 | 0.02 | 26.2* | 1755 | 7.8* | 2.5 | 13688 | 44 | ⊚ | ○ | |
| 8 | | 0.6* | 99 | 3.2 × 10³ | 0.4 | 0.02 | 31.1* | 1825 | 5.3* | 2.3 | 9723 | 41 | ⊚ | ○ | |
| 9 | | 5.3 | 94 | 2.7 × 10³ | 0.4 | 0.02 | 19.8 | 1320* | 14.7 | 5.8 | 19404 | 75 | ⊚ | ○ | |
| 10 | 4 | 6.1 | 93 | 3.8 × 10³ | 1.0 | 0.03 | 12.1 | 1882 | 10.4 | 3.6 | 19574 | 52 | ⊚ | ○ | Inventive example |
| 11 | 5 | 6.0 | 92 | 2.9 × 10³ | 1.1 | 0.01 | 14.0 | 1690 | 10.1 | 3.2 | 17065 | 59 | ⊚ | ⊚ | |
| 12 | 6 | 5.6 | 92 | 3.6 × 10³ | 0.8 | 0.02 | 15.5 | 1697 | 9.9 | 3.0 | 16798 | 60 | ⊚ | ○ | |
| 13 | 7 | 7.3 | 91 | 3.2 × 10³ | 0.5 | 0.02 | 4.9 | 1716 | 12.0 | 4.2 | 20597 | 56 | ⊚ | ○ | |
| 14 | | 6.4 | 92 | 3.2 × 10³ | 0.5 | 0.02 | 11.3 | 1739 | 10.6 | 3.2 | 18435 | 54 | ⊚ | ○ | |
| 15 | | 5.8 | 93 | 3.3 × 10³ | 0.5 | 0.02 | 14.7 | 1753 | 10.3 | 3.0 | 18054 | 53 | ⊚ | ○ | |
| 16 | | 5.6 | 92 | 3.4 × 10³ | 0.5 | 0.02 | 16.3 | 1759 | 9.8 | 3.1 | 17242 | 52 | ⊚ | ○ | |
| 17 | | 0.5* | 98 | 3.4 × 10³ | 0.5 | 0.02 | 30.7* | 1912 | 4.4* | 2.6 | 8352 | 41 | ⊚ | ○ | Comparative example |
| 18 | | 5.2 | 94 | 2.5 × 10³ | 0.5 | 0.02 | 19.2 | 1358* | 13.3 | 5.0 | 18061 | 72 | ⊚ | ○ | |
| 19 | 8 | 7.1 | 91 | 3.6 × 10³ | 0.9 | 0.04 | 7.2 | 1794 | 11.1 | 3.8 | 19968 | 58 | ⊚ | ○ | Inventive example |
| 20 | | 6.6 | 93 | 3.5 × 10³ | 0.9 | 0.04 | 9.0 | 1801 | 10.9 | 3.2 | 19625 | 54 | ⊚ | ○ | |
| 21 | | 6.3 | 91 | 3.5 × 10³ | 0.9 | 0.04 | 12.1 | 1812 | 10.5 | 3.3 | 19000 | 54 | ⊚ | ○ | |
| 22 | | 5.6 | 93 | 3.4 × 10³ | 0.9 | 0.04 | 16.1 | 1829 | 9.9 | 3.0 | 18090 | 52 | ⊚ | ○ | |
| 23 | | 0.3* | 99 | 3.6 × 10³ | 0.9 | 0.04 | 30.3* | 1990 | 4.1* | 2.4 | 8110 | 39 | ⊚ | ○ | Comparative example |
| 24 | | 5.6 | 94 | 2.4 × 10³ | 0.9 | 0.04 | 17.8 | 1325* | 14.5 | 5.0 | 19213 | 70 | ⊚ | ○ | |
| 25 | 9 | 6.3 | 93 | 3.7 × 10³ | 1.9 | 0.16 | 12.4 | 1803 | 10.4 | 2.9 | 18821 | 43 | ⊚ | ○ | Inventive example |
| 26 | 10 | 5.2 | 92 | 3.6 × 10³ | 1.8 | 0.15 | 13.7 | 1820 | 10.1 | 2.8 | 18382 | 40 | ⊚ | ○ | |
| 27 | 11* | 2.6* | 96 | 3.5 × 10³ | 0.8 | 0.03 | 29.0* | 1822 | 7.1* | 2.4 | 13002 | 52 | xx | — | Comparative example |
| 28 | 12* | 2.5* | 95 | 2.7 × 10³ | 1.0 | 0.03 | 29.2* | 1759 | 7.1* | 2.0 | 12469 | 43 | x | ⊚ | |
| 29 | 13 | 7.8 | 91 | 3.5 × 10³ | 0.5 | 0.02 | 3.9 | 1689 | 11.3** | 3.6 | 19086 | 58 | ⊚ | xx | Reference example |
| 30 | 14 | 7.8 | 91 | 3.4 × 10³ | 0.5 | 0.03 | 4.2 | 1690 | 11.5** | 3.7 | 19435 | 58 | ⊚ | — | |
| 31 | 15 | 7.6 | 92 | 3.5 × 10³ | 0.4 | 0.03 | 4.1 | 1699 | 11.6** | 3.6 | 19708 | 57 | ⊚ | xx | |
| 32 | 16 | 7.9 | 92 | 5.7 × 10³* | 0.5 | 0.03 | 3.9 | 1688 | 6.8* | 0.1 | 11478 | 35 | xx | — | Comparative example |
| 33 | 17 | 0.3* | 92 | 5.6 × 10³* | 0.5 | 0.03 | 33.1* | 1799 | 4.2* | 0.2 | 7556 | 34 | xx | — | |
| 34 | 18* | 2.8* | 95 | 5.5 × 10³* | 0.6 | 0.04 | 29.0* | 1810 | 7.0* | 2.4 | 12670 | 31 | x | ⊚ | |

*indicates that conditions do not satisfy those defined by the present invention.
**indicates that a total elongation is partially less than 8.0%.

Referring to Tables 1 to 4, Test Nos. 1 to 5, 10 to 16, 19 to 22, 25, and 26, which satisfied all of the chemical compositions and steel micro-structure specified in the present invention, resulted in tensile strengths of 1.4 GPa or higher, resulted in total elongations of 8.0% or higher and were excellent in ductility, resulted in impact values of 40 J/cm² or higher and were excellent in toughness, and also resulted in excellent scale adhesiveness properties. These samples all had k values of less than 20, and it is understood that increases in ductility were achieved by the TRIP effect. Among others, Test Nos. 1, 3 to 5, 10 to 16, and 19 to 22, which had values of Mn segregation degree α of 1.6 or lower and had indexes of cleanliness of 0.10% or lower, resulted in impact values of 50 J/cm² or higher and were excellent particularly in toughness.

Meanwhile, Test Nos. 6 to 8, 17, 23, and 33 showed the volume ratios of retained austenite were less than 5.0% owing to excessively high cooling rates from the Ms point to 100° C. As a result, the total elongations were less than 8.0%, so that a desired ductility was not obtained. Also from the fact that the k values were 20 or larger, it is considered that the TRIP effect did not exert sufficiently, and increases in ductility could not thereby be achieved.

In addition, Test Nos. 9, 18, and 24 suffered pronounced decarburization owing to inappropriate heating conditions in heating up to a temperature range from the $Ac_3$ point to the $Ac_3$ point+200° C., and failed to secure tensile strengths of 1.4 GPa or higher.

Test Nos. 27 and 28, which did not satisfy the chemical compositions defined by the present invention, resulted in values of maximum height roughness Rz of less than 3.0 μm and were poor in scale adhesiveness property. Moreover, because the volume ratios of retained austenite were less than 5.0%, test Nos. 27 and 28 resulted in total elongations of less than 8.0% and were poor in ductility.

As to Test Nos. 32 and 33, the time from the termination of the rough rolling to the start of the finish rolling in the hot rolling step exceeded 10 seconds. In addition, as to Test No. 34, the content of Si was lower than the range specified in the present invention, and the winding temperature was high. Owing to them, as to Test Nos. 32 to 34, the values of maximum height roughness Rz thereof were less than 3.0 μm. In addition, the number densities of retained carbide thereof exceeded 4.0×10³/mm², and thus scale adhesiveness properties thereof were poor, and the impact values thereof were less than 40 J/cm², so that a desired toughness was not obtained.

Test Nos. 29 to 31 were reference examples using steel sheets for heat treatment that satisfied the specifications according to the present invention but were poor in scale property. As to Test Nos. 29 and 31, the values of maximum height roughness Rz exceeded 10.0 μm owing to an insufficient amount of scarfing in the pickling step after the hot rolling, resulted in poor scale peeling properties. Further, as to Test No. 30, the value of maximum height roughness Rz was less than 3.0 μm owing to an excessive amount of scarfing in the pickling step after the hot rolling, resulted in a poor scale adhesiveness property.

As to Test Nos. 29 and 31, cooling unevenness occurred partially owing to an uneven shape because the maximum height roughnesses were excessively high. In addition, as to Test No. 30, cooling unevenness also occurred partially because the adhesiveness property of scales was poor. For this reason, these samples gave rise to variations in material quality. These tendencies were more pronounced when the hot forming was actually performed.

INDUSTRIAL APPLICABILITY

According to the present invention, by performing heat treatment or hot forming treatment on a steel sheet for heat treatment that is excellent in scale property during hot forming, it is possible to obtain a heat-treated steel sheet member that has a tensile strength of 1.4 GPa or higher and is excellent in toughness and ductility. The heat-treated steel sheet member according to the present invention is suitably used as an impact resistant part of an automobile.

What is claimed is:

1. A heat-treated steel sheet member having a chemical composition comprising, by mass %:
   C: 0.05 to 0.50%;
   Si: 0.50 to 5.0%;
   Mn: 1.5 to 4.0%;
   P: 0.05% or less;
   S: 0.05% or less;
   N: 0.01% or less;
   Ti: 0.01 to 0.10%;
   B: 0.0005 to 0.010%;
   Cr: 0 to 1.0%;
   Ni: 0 to 2.0%;
   Cu: 0 to 1.0%;
   Mo: 0 to 1.0%;
   V: 0 to 1.0%;
   Ca: 0 to 0.01%;
   Al: 0 to 1.0%;
   Nb: 0 to 1.0%;
   REM: 0 to 0.1%; and
   the balance: Fe and impurities, wherein
   the steel sheet member has a steel micro-structure comprising:
   mainly martensite;
   and retained austenite of which a volume ratio is 5.0% or higher,
   retained carbides are present in the steel sheet member, and a number density of retained carbides, each having a circle-equivalent diameter of 0.1 μm or larger, is 4.0×10³/mm² or lower,
   a value of strain induced transformation parameter k expressed by a following formula (i) is less than 20.0 when following mechanical properties are measured using a sheet specimen specified in ASTM E8,
   a tensile strength is 1.4 GPa or higher, and
   a total elongation is 8.0% or higher:

$$k=(\log f_{\gamma 0}-\log f_\gamma(0.02))/0.02 \quad (i)$$

where meaning of each symbol in the above formula is as follows:
   $f_{\gamma 0}$: Volume ratio of retained austenite present in the steel sheet member
   $f_\gamma(0.02)$: Volume ratio of retained austenite present in the steel sheet member after a true strain of 0.02 is applied to and unloaded from the member.

2. The heat-treated steel sheet member according to claim 1, wherein the chemical composition contains, by mass %, one or more elements selected from:
   Cr: 0.01 to 1.0%;
   Ni: 0.1 to 2.0%;
   Cu: 0.1 to 1.0%;
   Mo: 0.1 to 1.0%;
   V: 0.1 to 1.0%;
   Ca: 0.001 to 0.01%;

Al: 0.01 to 1.0%;
Nb: 0.01 to 1.0%; and
REM: 0.001 to 0.1%.

3. The heat-treated steel sheet member according to claim 1, wherein an Mn segregation degree α expressed by a following formula (ii) is 1.6 or lower:

α=[Maximum Mn concentration (mass %) at sheet-thickness center portion]/[Average Mn concentration (mass %) in ¼ sheet-thickness depth position from surface]     (ii).

4. The heat-treated steel sheet member according to claim 1, wherein a value of an index of cleanliness of steel specified in 315 G 0555 (2003) is 0.10% or lower.

5. A method for producing a heat-treated steel sheet member according to claim 1, the method comprising:
heating a steel sheet up to a temperature range from an $Ac_3$ point to the $Ac_3$ point+200° C. at an average temperature rise rate of 5° C./s or higher;
subsequently, cooling the steel sheet from the temperature range down to an Ms point at an upper critical cooling rate or higher; and
subsequently, cooling the steel sheet from the Ms point down to 100° C. at an average cooling rate of 5° C./s or lower, wherein
the steel sheet subjected to the heating and cooling steps has:
a chemical composition comprising, by mass %:
C: 0.05 to 0.50%;
Si: 0.50 to 5.0%;
Mn: 1.5 to 4.0%;
P: 0.05% or less;
S: 0.05% or less;
N: 0.01% or less;
Ti: 0.01 to 0.10%;
B: 0.0005 to 0.010%;
Cr: 0 to 1.0%;
Ni: 0 to 2.0%;
Cu: 0 to 1.0%;
Mo: 0 to 1.0%;
V: 0 to 1.0%;
Ca: 0 to 0.01%;
Al: 0 to 1.0%;
Nb: 0 to 1.0%;
REM: 0 to 0.1%; and
the balance: Fe and impurities;
a maximum height roughness Rz on a surface of 3.0 to 10.0 μm; and
a number density of carbide having circle-equivalent diameters of 0.1 μm or larger of $8.0 \times 10^3/mm^2$ or lower.

6. The method for producing a heat-treated steel sheet member according to claim 5, wherein the chemical composition contains, by mass %, one or more elements selected from:
Cr: 0.01 to 1.0%;
Ni: 0.1 to 2.0%;
Cu: 0.1 to 1.0%;
Mo: 0.1 to 1.0%;
V: 0.1 to 1.0%;
Ca: 0.001 to 0.01%;
Al: 0.01 to 1.0%;
Nb: 0.01 to 1.0%; and
REM: 0.001 to 0.1%.

7. The method for producing a heat-treated steel sheet member according to claim 5, wherein an Mn segregation degree a expressed by a following formula (ii) is 1.6 or lower:

α=[Maximum Mn concentration (mass %) at sheet-thickness center portion]/[Average Mn concentration (mass %) in ¼ sheet-thickness depth position from surface]     (ii).

8. The method for producing a heat-treated steel sheet member according to claim 5, wherein a value of an index of cleanliness of steel specified in NS G 0555 (2003) is 0.10% or lower.

9. The method for producing a heat-treated steel sheet member according to claim 5, wherein the steel sheet is subjected to hot forming after being heated up to the temperature range and before being cooled down to the Ms point.

10. The heat-treated steel sheet member according to claim 2, wherein an Mn segregation degree α expressed by a following formula (ii) is 1.6 or lower:

α=[Maximum Mn concentration (mass %) at sheet-thickness center portion]/[Average Mn concentration (mass %) in ¼ sheet-thickness depth position from surface]     (ii).

11. The heat-treated steel sheet member according to claim 2, wherein a value of an index of cleanliness of steel specified in MS G 0555 (2003) is 0.10% or lower.

12. The heat-treated steel sheet member according to claim 3, wherein a value of an index of cleanliness of steel specified in MS G 0555 (2003) is 0.10% or lower.

13. The heat-treated steel sheet member according to claim 10, wherein a value of an index of cleanliness of steel specified in MS G 0555 (2003) is 0.10% or lower.

* * * * *